United States Patent
Balon et al.

(10) Patent No.: US 12,257,645 B2
(45) Date of Patent: Mar. 25, 2025

(54) TURBOCHARGER TURBINE ASSEMBLY HAVING POST ATTACHMENT VIA A TAILED LASER BEAM WELD

(71) Applicant: Garrett Transportation I Inc., Torrance, CA (US)

(72) Inventors: Petr Balon, Brno (CZ); Lucie Kovarova, Brno (CZ); Antonin Forbelsky, Brno (CZ); Philippe Renaud, Brno (CZ)

(73) Assignee: GARRETT TRANSPORTATION I INC, Torrance, CA (US)

( * ) Notice: Subject to any disclaimer, the term of this patent is extended or adjusted under 35 U.S.C. 154(b) by 0 days.

(21) Appl. No.: 18/129,607

(22) Filed: Mar. 31, 2023

(65) Prior Publication Data
US 2024/0326162 A1    Oct. 3, 2024

(51) Int. Cl.
| | |
|---|---|
| B23K 26/06 | (2014.01) |
| B23K 26/21 | (2014.01) |
| B23K 26/244 | (2014.01) |
| B23K 26/28 | (2014.01) |
| B23K 26/282 | (2014.01) |
| B23K 26/30 | (2014.01) |
| B23K 26/302 | (2014.01) |
| F04D 17/10 | (2006.01) |

(Continued)

(52) U.S. Cl.
CPC .......... *B23K 26/0626* (2013.01); *B23K 26/21* (2015.10); *F04D 17/10* (2013.01); *F04D 29/22* (2013.01); *F04D 29/4206* (2013.01); *B23K 26/244* (2015.10); *B23K 26/28* (2013.01); *B23K 26/282* (2015.10); *B23K 26/30* (2013.01); *B23K 26/302* (2015.10); *B23K 2101/001* (2018.08)

(58) Field of Classification Search
CPC ................ B23K 26/0626; B23K 26/21; B23K 2101/001; F04D 17/10; F04D 29/22; F04D 29/4206
See application file for complete search history.

(56) References Cited

U.S. PATENT DOCUMENTS

| | | | |
|---|---|---|---|
| 4,643,649 A | 2/1987 | Burdette et al. | |
| 4,654,941 A | 4/1987 | Burdette et al. | |

(Continued)

FOREIGN PATENT DOCUMENTS

| | | |
|---|---|---|
| EP | 1 528 255 B1 | 10/2003 |
| EP | 1 676 980 B1 | 12/2004 |
| EP | 3 628 826 A2 | 4/2020 |

*Primary Examiner* — Dominick L Plakkoottam
*Assistant Examiner* — Paul W Thiede
(74) *Attorney, Agent, or Firm* — BelayIP

(57) ABSTRACT

A turbine housing assembly is disclosed, the assembly including a turbine housing defining a rotational axis for a turbine wheel. The assembly further includes a cartridge that is receivable by the turbine housing, the cartridge including spacer posts and a plate component that includes spacer post openings. The spacer posts may be laser beam welded into the spacer post openings to form laser beam welds as well as define an axial vane clearance between the plate component and a surface of the turbine housing. The turbine housing is further contacted by ends of the spacer posts. Each of the laser beam welds includes a power ramp-up area, an intermediate area and a power ramp-down area, where the power ramp-down area curves away from the power ramp-up area to reduce weld defects.

9 Claims, 10 Drawing Sheets

(51) Int. Cl.
    *F04D 29/22*     (2006.01)
    *F04D 29/42*     (2006.01)
    *B23K 101/00*     (2006.01)

(56) References Cited

U.S. PATENT DOCUMENTS

| | | |
|---|---|---|
| 4,659,295 A | 4/1987 | Burdette et al. |
| 4,804,316 A | 2/1989 | Fleury |
| 7,507,067 B2 | 3/2009 | Boening et al. |
| 7,918,023 B2 | 4/2011 | Sausse et al. |
| 2005/0169748 A1 | 8/2005 | Metz et al. |
| 2006/0140751 A1 | 6/2006 | Boening et al. |
| 2020/0254562 A1* | 8/2020 | Brescoe ................. B23K 26/22 |

* cited by examiner

500

510

520

530

540

TURBOCHARGER TURBINE ASSEMBLY HAVING POST ATTACHMENT VIA A TAILED LASER BEAM WELD

TECHNICAL FIELD

Subject matter disclosed herein relates generally to turbochargers for internal combustion engines.

BACKGROUND

Exhaust driven turbochargers include a rotating group that includes a turbine wheel and a compressor wheel that are connected to one another by a shaft. The shaft is typically rotatably supported within a center housing by one or more bearings. During operation, exhaust from an internal combustion engine drives a turbocharger's turbine wheel, which, in turn, drives the compressor wheel to boost charge air to the internal combustion engine.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
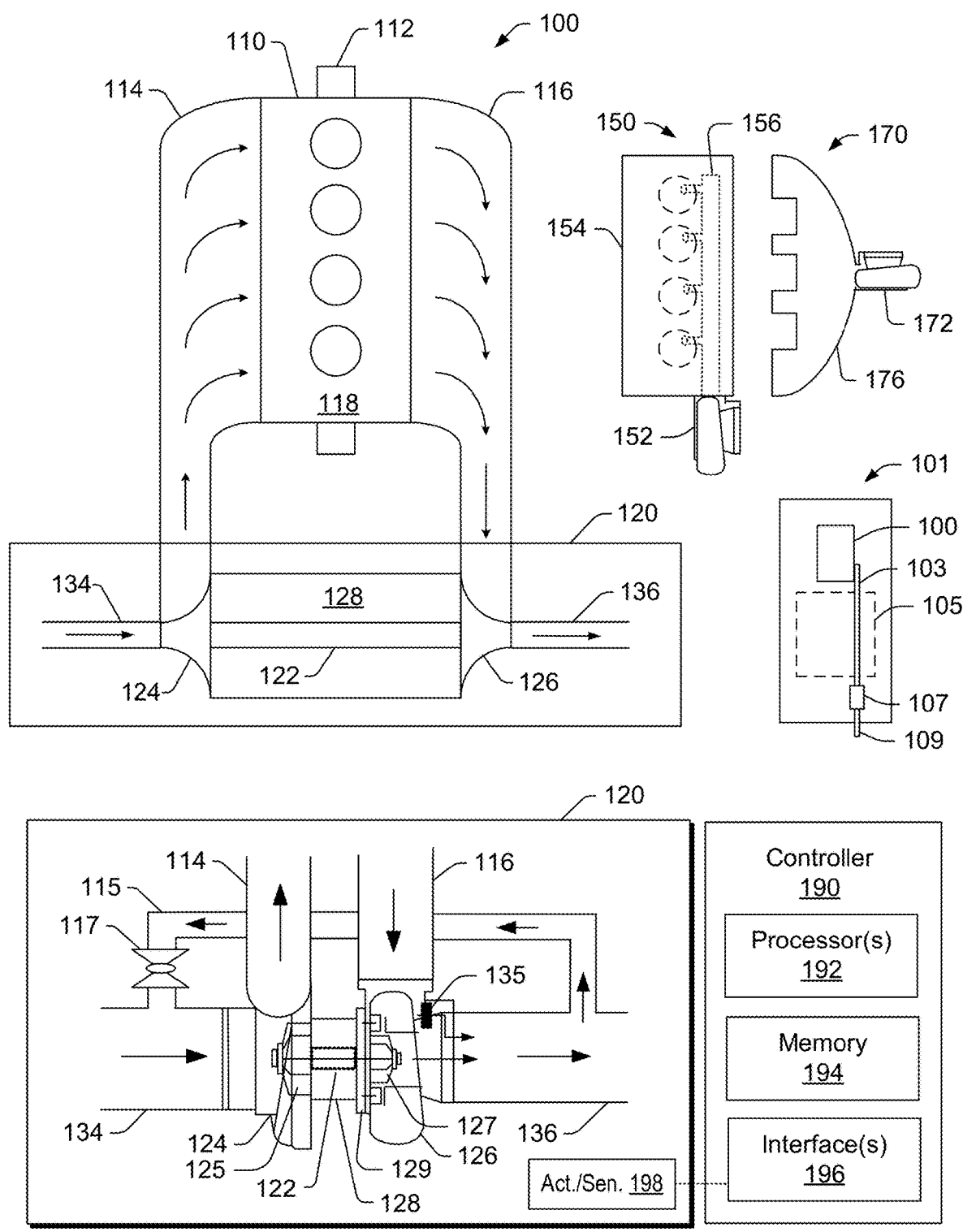
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
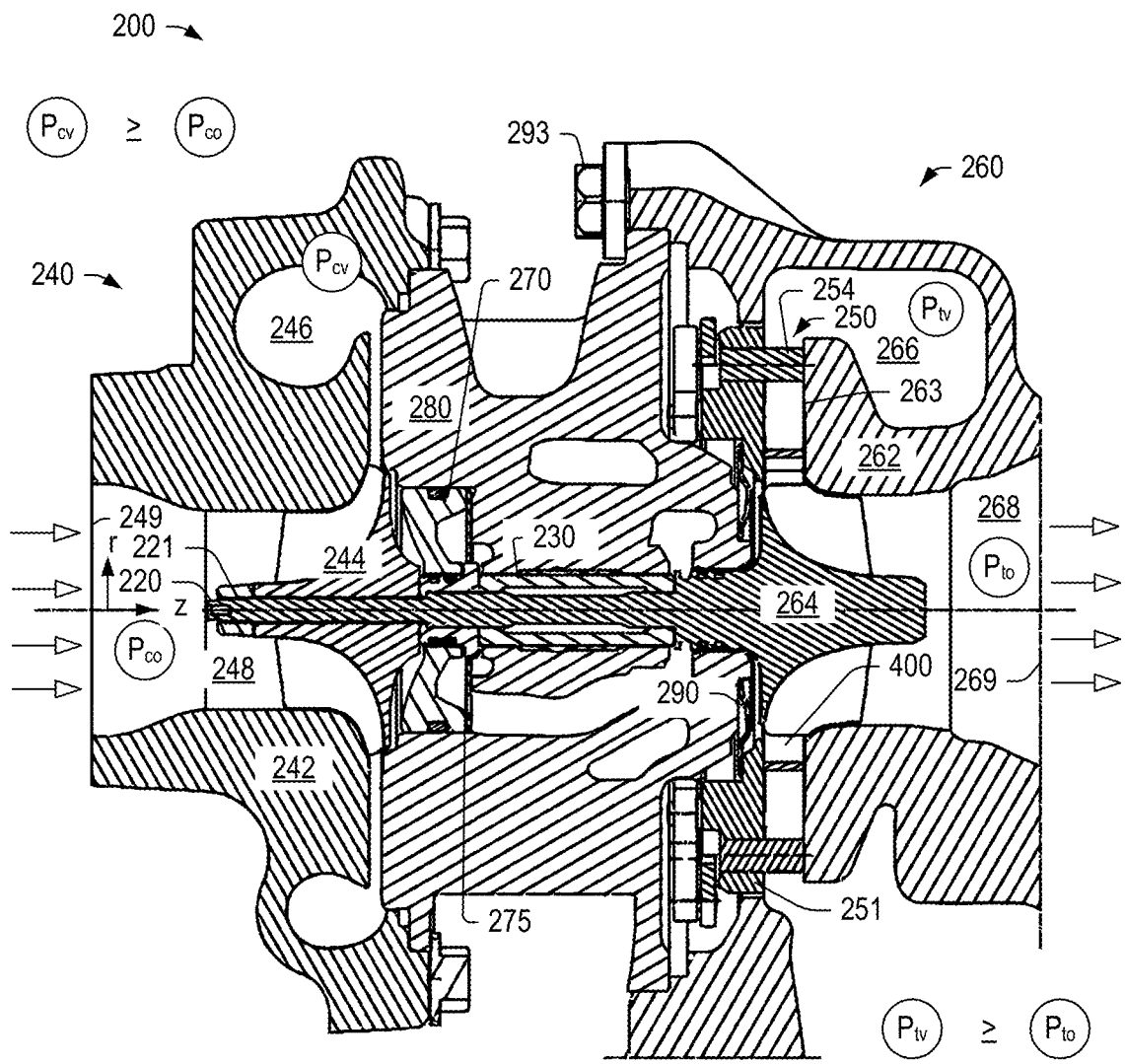
FIG. 2 is a cutaway view of an example of a turbocharger.

FIG. 2 shows an example of a turbocharger assembly 200 that includes a shaft 220 supported by a bearing 230 (e.g., a journal bearing, a bearing assembly such as a rolling element bearing with an outer race, etc.) disposed in a bore (e.g., a through bore defined by one or more bore walls) of a housing 280 between a compressor assembly 240 that defines a compressor side (left side of FIG. 2) and a turbine assembly 260 that defines a turbine side (right side of FIG. 2). The compressor assembly 240 includes a compressor housing 242 that defines a volute 246 and that houses a compressor wheel 244. As shown in FIG. 2, the turbine assembly 260 includes a turbine housing 262 that defines a volute 266 and that houses a turbine wheel 264. The turbine wheel 264 may be, for example, welded or otherwise attached to the shaft 220 to form a shaft and wheel assembly (SWA) where a free end of the shaft 220 allows for attachment of the compressor wheel 244.

As an example, a wheel, whether a turbine wheel or a compressor wheel, can include an inducer portion and an exducer portion, for example, characterized in part by an inducer radius ($r_i$) and an exducer radius ($r_e$). As an example, an individual blade can include an inducer edge (e.g., a leading edge) and an exducer edge (e.g., a trailing edge). A wheel may be defined in part by a trim value that characterizes a relationship between inducer and exducer portions.

For a compressor wheel, the inducer portion can be characterized by a minor diameter; whereas, for a turbine wheel, the inducer portion can be characterized by a major diameter. During operation, inlet flow to a compressor wheel or a turbine wheel occurs with respect to its inducer portion and outlet flow from a compressor wheel or a turbine wheel occurs with respect to its exducer portion.

As to air flow, during operation of the turbocharger 200, air can be directed from the compressor wheel 244 to the volute 246 via a diffuser section defined in part by the compressor housing 242 and a compressor side plate or a portion of a housing 280 as the compressor wheel 244 rotates, drawing air into a passage via an inlet. As indicated in FIG. 2, during operation of the turbocharger 200, the compressor wheel 244 acts to boost air pressure such that air pressure in the volute 246 ($P_{cv}$) is greater than air pressure in the passage 248 ($P_{co}$). Rotation of the compressor wheel 244 can generate a negative pressure that acts to "suck" air into the compressor assembly 240 and to direct such air to the volute 246 via the diffuser section. As an example, where exhaust gas recirculation (EGR) is implemented, environmental air may be mixed with exhaust (e.g., upstream and/or downstream of the compressor wheel 244).

In the example of FIG. 2, an axial locating pin may be received in an opening of the bearing 230, which may be a cross-bore of the bearing 230. As an example, one or more other types of axial locating mechanisms may be included in a turbocharger that act to limit axial movement of a bearing (e.g., and/or movement in one or more other directions). As an example, a locating pin may allow for radial movement of a bearing, which may allow for effective operation of one or more lubricant films disposed about a surface of the bearing.

In the example of FIG. 2, the shaft 220 includes a step (e.g., a shoulder) that forms an axial annular face. In the example of FIG. 2, a thrust collar 275 (e.g., a type of collar) includes a surface that is seated against the axial annular face of the shaft 220. In such an example, a lock nut 221 can include threads that match threads of an end portion of the shaft 220 such that tightening of the lock nut 221 with respect to the shaft 220 loads the compressor wheel 244 and the thrust collar 275 against the axial annular face of the shaft 220, which can place the shaft 220 (e.g., from the step to its end portion) in tension. In such an example, the shaft 220, the compressor wheel 244 and the lock nut 221 can rotate as a unit (e.g., responsive to exhaust driving the turbine wheel 264). As shown in the example of FIG. 2, a compressor side plate 270 can include a bore (e.g., an opening) in which at least a portion of the thrust collar 275 is positioned where the thrust collar 275 (and/or the compressor side plate 270) can include a groove or grooves that may seat a seal element or seal elements (e.g., O-rings, piston rings, etc.).

In the example of FIG. 2, the turbine assembly 260 includes a variable geometry assembly 250, which may be referred to as a "cartridge" (e.g., the cartridge 250), that may be positioned using a plate component 251 (e.g., optionally shaped as a stepped annular disc or annular plate), of the cartridge 250 that clamps between the housing 280 and the turbine housing 262, for example, using bolts 293 and a heat shield 290 (e.g., optionally shaped as a stepped annular disc), the latter of which is disposed between the cartridge 250 and the housing 280 and may be resilient in that it can apply a biasing force. As shown in the example of FIG. 2, the cartridge 250 includes a number of spacer posts 254 that can abut a surface 263 of the turbine housing 262 (e.g., an annular surface) where the spacer posts 254 are secured to the plate component 251. As shown, the space posts 254 can axially space the plate component 251 an axial distance from the surface 263 of the turbine housing 262, for example, to define a vane space (e.g., or nozzle space).

As an example, vanes 400 may be positioned between the surface 263 of the turbine housing 262 and the plate component 251, for example, where a control mechanism may cause pivoting of the vanes 400. As an example, the vane 400 may include a vane post that extends axially to operatively couple to a control mechanism, for example, for pivoting of the vane 400 about a pivot axis defined by the vane post.

As to exhaust flow, during operation of the turbocharger 200, higher pressure exhaust in the volute 266 passes through passages (e.g., a nozzle or nozzles, a throat or throats, etc.) of the cartridge 250 to reach the turbine wheel 264 as disposed in a turbine wheel space defined at least in part by the cartridge 250 and at least in part by the turbine housing 262. After passing through the turbine wheel space, exhaust travels axially outwardly along a passage 268 defined by a wall of the turbine housing 262 that also defines an opening 269 (e.g., an exhaust outlet). As indicated, during operation of the turbocharger 200, exhaust pressure in the volute 266 ($P_{tv}$) is greater than exhaust pressure in the passage 268 ($P_{to}$).

As an example, exhaust pressure in the turbine assembly 260 can depend on position or positioning of the vanes 400. For example, closing and/or opening of the vanes 400 (e.g., narrowing or widening throats) can effect exhaust gas pressure at one or more locations.

As an example, a turbine assembly of an exhaust gas turbocharger can include vanes as part of a variable geometry turbine (VGT) or variable nozzle turbine (VNT). Vanes may be disposed at least in part in a cartridge where the cartridge is disposed between a turbine housing and a center housing of a turbocharger.

As an example, a cartridge may include a nozzle wall component and a plate component spaced axially by mounts (e.g., spacers) where vanes are accommodated to control exhaust flow from a volute to a turbine wheel space. In the example of FIG. 2, the cartridge 250 does not include a nozzle wall component as the spacer posts 254 can abut the surface 263 of the turbine housing 262, which can act as a nozzle wall component. As an example, a vane may include a trailing edge and a leading edge with a pressure side airfoil and a suction side airfoil that meet at the trailing edge and the leading edge. Such a vane may have a planar upper surface and a planar lower surface where a clearance exists between the planar upper surface and the nozzle wall component or turbine housing surface (e.g., between a lower planar surface of an annular portion of the nozzle wall component or turbine housing) and/or where a clearance exists between the planar lower surface and the plate component (e.g., between an upper planar surface of an annular portion of the plate component).

As an example, each vane may include an axis about which the vane may pivot (e.g., a pivot axis). As an example, each vane may include a post (e.g., or axle) that defines a pivot axis. As an example, a post may be integral with a vane (e.g., cast as a single piece of metal, alloy, etc.) or a post may be a separate component that can be operatively coupled to a vane.

As an example, movement of a vane (e.g., arcwise) may be less closer to the pivot axis and greater further away from the pivot axis. For example, a trailing edge or a leading edge may be disposed a distance from the pivot axis such that upon pivoting of a vane, the leading edge and/or the trailing edge sweeps a maximum arc of the vane for a desired amount of pivoting. If clearance between an upper surface of a vane and a lower surface of a nozzle wall component or a turbine housing surface is diminished, the vane may bind (e.g., stick), where the risk may increase depending on arc length as interaction area can increase with respect to arc length. In such an example, deformation to one or more components may cause a vane or vanes to bind upon pivoting or even in a static position. Binding (e.g., sticking) can result in loss of control, stress to a control mechanism, wear, etc.

As an example, forces acting on a vane and/or a post of a vane may cause a vane or vanes to bind upon pivoting or even in a static position. Binding can result in loss of control, stress to a control mechanism, wear, etc.

As to pressure differentials and temperatures in a variable geometry turbine assembly, as an example, exhaust in a volute may have pressure in a range of approximately 120 kPa to approximately 400 kPa and possible peak pressure of up to approximately 650 kPa (absolute) and, for example, temperature in a range of approximately 150 degrees C. to approximately 980 degrees C.; whereas, at a location axially downstream of a turbine wheel, exhaust may have pressure in a lower range and temperature in a lower range. Exhaust gas temperatures in a gasoline fuel internal combustion engine may exceed those of a diesel fuel internal combustion engine. Where a variable geometry turbine assembly is utilized with a gasoline fuel internal combustion engine, the environment may be harsher in terms of temperature when compared to a diesel fuel internal combustion engine.

As an example, one or more components of a variable geometry turbine assembly (e.g., VGT assembly or variable nozzle turbine (VNT) assembly) can include at least a portion made of a material that can withstand pressures and temperatures in the aforementioned ranges. For example, a material can be the INCONEL 718 alloy (Specialty Materials Corporation, New Hartford, NY). Some other examples of materials include INCONEL 625, C263 (aluminum-titanium age hardening nickel), René41 (nickel-based alloy), WASPALOY alloy (age hardened austenitic nickel-based alloy, United Technologies Corporation, Hartford, CT), etc.

As an example, a cartridge can include vanes that are carried by a component such as, for example, the plate component 251. As an example, at least a portion of a vane may be made of a material such as HK30, which is a chromium-nickel-iron stainless steel alloy including approximately 30% chromium and 20% nickel, with the balance being predominantly iron (percentages by mass). As an example, at least a portion of a vane may be made of a HK series stainless steel alloy that includes about 18-22% nickel by mass. Such an alloy can be fully austenitic. As an example, one or more components of a cartridge may be made of a material such as, for example, PL23 alloy or 310 SS alloy.

As an example, an exhaust gas variable geometry turbine assembly can include a number of pivotable vanes that define, at least in part, throats within an exhaust gas nozzle where each of the pivotable vanes includes a corresponding post.

Figure 3A:
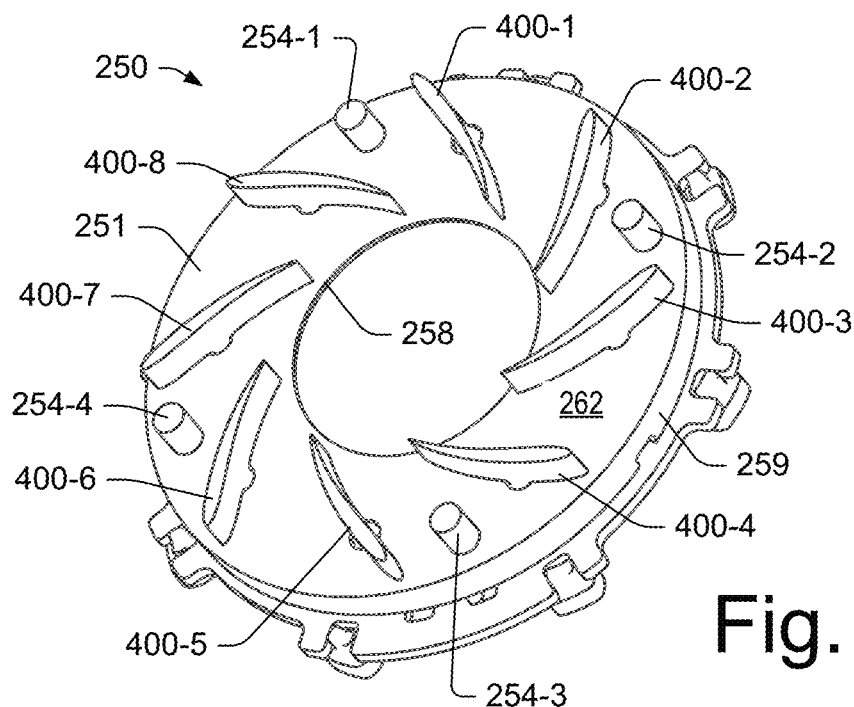
FIGS. 3A and 3B are perspective views of an example of a cartridge of a turbocharger.
Figure 3B:
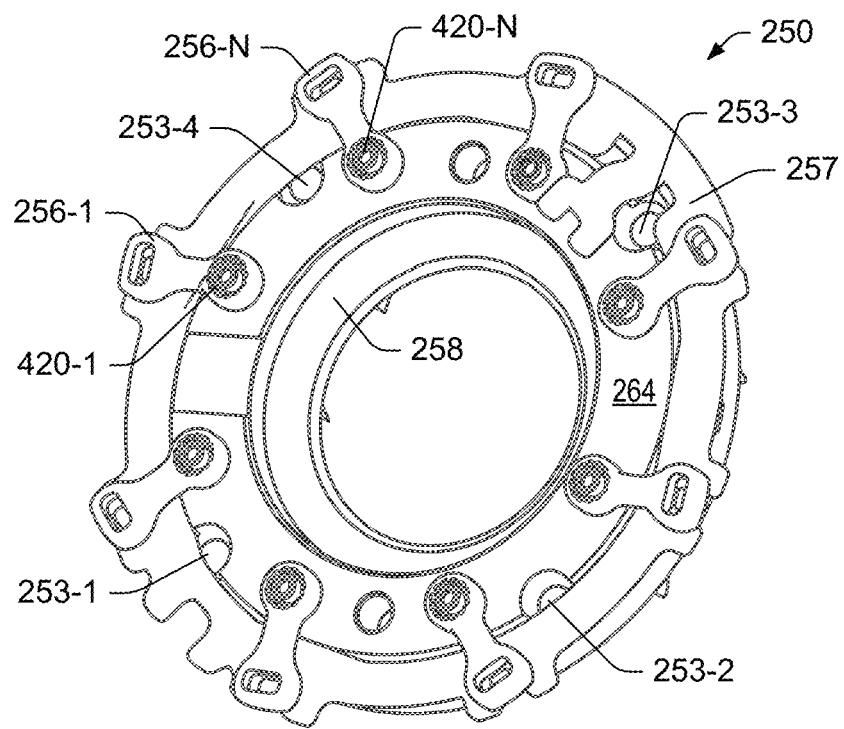

FIGS. 3A and 3B show perspective views of the example cartridge 250 of FIG. 2. In FIGS. 3A and 3B, the plate component 251 includes spacer post openings 253-1, 253-2, 253-3 and 253-4, to accommodate the space posts 254-1, 254-2, 254-3 and 254-4, that are disposed between an inner perimeter 258 and an outer perimeter 259 of the plate component 251 and extend between opposing surfaces 262 and 264 (e.g., an upper surface and a lower surface). As shown, the spacer post openings 253-1, 253-2, 253-3 and 253-4 are disposed closer to the outer perimeter 259 than the inner perimeter 258. In such an approach, the spacer posts 254-1, 254-2, 254-3 and 254-4 may have less effect on the throats formed between trailing edges of adjacent vanes of the vanes 400-1 to 400-8. While the example of FIG. 3A and FIG. 3B shows four posts, a cartridge may include fewer posts or more posts.

As shown in the example of FIG. 3A and FIG. 3B, the plate component 251 is coupled to a unison control ring 257 that is operatively coupled to vane control arms 256-1 to 256-N for corresponding vane posts 420-1 to 420-N for corresponding vanes 400-1, 400-2, 400-3, 400-4, 400-5, 400-6, 400-7 and 400-8 (e.g., where N is equal to 8, noting that N may be less than 8 or greater than 8). As an example, a vane control mechanism can be actuated to rotate the unison control ring 257 to thereby cause the vanes 400-1 to 400-8 to pivot.

In the example of FIGS. 3A and 3B, the cartridge 250 can be installed in a turbocharger, which may then be installed in an engine compartment of an internal combustion engine. The plate component 251 can be subjected to various conditions (e.g., forces, temperatures, pressures, etc.), which can impact the plate component 251 (e.g., as to integrity, shape, etc.). Further, the spacer posts 254-1, 254-2, 254-3 and 254-4 may be affected, including interfaces between the spacer posts 254-1, 254-2, 254-3 and 254-4 and the plate component 251, as may be defined at least in part via the spacer post openings 253-1, 253-2, 253-3 and 253-4. As shown, a spacer post may be substantially cylindrical in shape where an opening is defined by a cylindrical surface that can abut an outer cylindrical surface of a spacer post. As an example, a spacer post may be interference fit into an opening of a plate component such that a desired alignment can be maintained during a welding process that welds the spacer post to the plate component.

Figure 4:
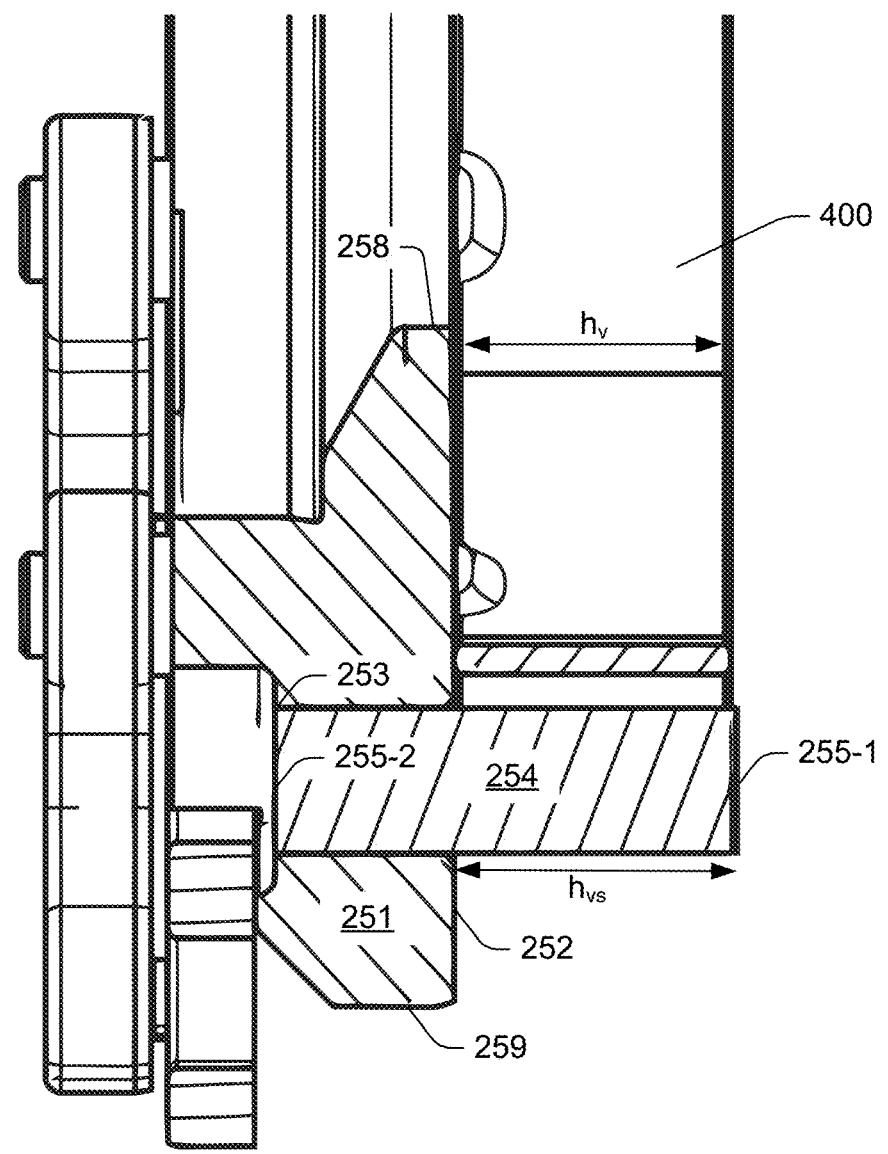
FIG. 4 is a cutaway view of a portion of the cartridge of FIGS. 3A and 3B.

FIG. 4 shows a cross-sectional, cut-away view of a portion of the cartridge 250 where the plate component 251 is shown with the inner perimeter 258 and the outer perimeter 259 along with the spacer post 254 as received by the spacer post opening 253 of the plate component 251. As shown, the spacer post 254 has an upper surface 255-1 that can abut a surface of a turbine housing. For example, the upper surface 255-1 can directly contact a surface of a turbine housing to define a vane space between a surface 252 of the plate component 251 and the surface of the turbine housing (see, e.g., the surface 263 of FIG. 2). As shown, a portion of the spacer post 254 is surrounded by the plate component 251 while another portion of the spacer post 254 extends outwardly away from the plate component 251. In the example of FIG. 4, approximately 40 percent of the length of the spacer post 254 is supported by the plate component 251, which may be sufficient to laterally support the spacer post 254, which may reduce stress placed upon a weld between the spacer post 254 and the plate component 251. As an example, a portion of a spacer post seated in a plate component may be approximately 10 percent to approximately 60 percent of a length of the spacer post or, for example, within a range of approximately 25 percent to approximately 50 percent.

As shown in the example of FIG. 4, the spacer post 254 has opposing end surfaces, which are referred to as the upper surface 255-1 and a lower surface 255-2 where, for example, a weld may be formed at the lower surface 255-2 (e.g., at a joint formed between an outer radius of the spacer post 254 and an inner radius of the opening 253 in the plate component 251). As an example, a spacer post can define a vane space with a height that is slightly greater than a vane height such that a vane can be movable within the vane space. For example, in FIG. 4, the spacer post 254 provides a vane space that has a height $h_{vs}$ (e.g., an axial vane clearance) greater than the vane height $h_v$. In the example of FIG. 4, the spacer post 254 has a length that is greater than its radius. For example, consider a post length that is at least four times a post radius.

Figure 5:
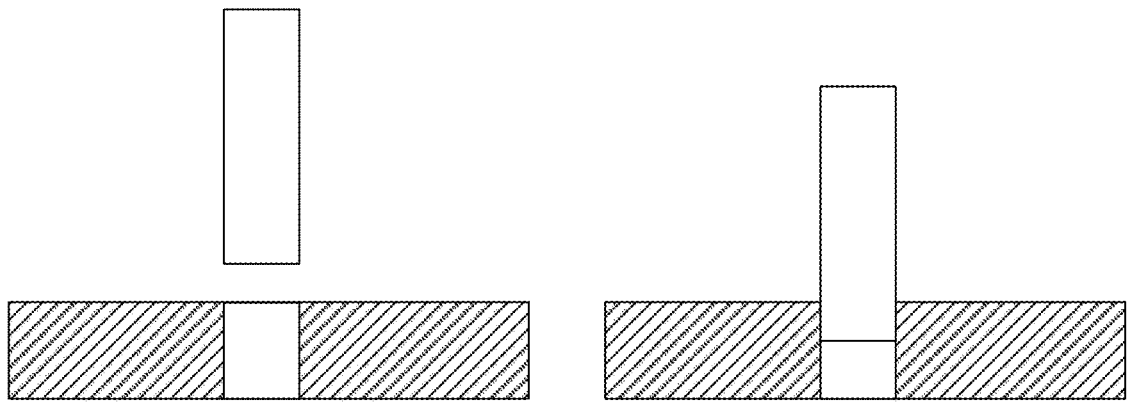
FIG. 5 is a graphical view of an example of a method.
Figure 5:
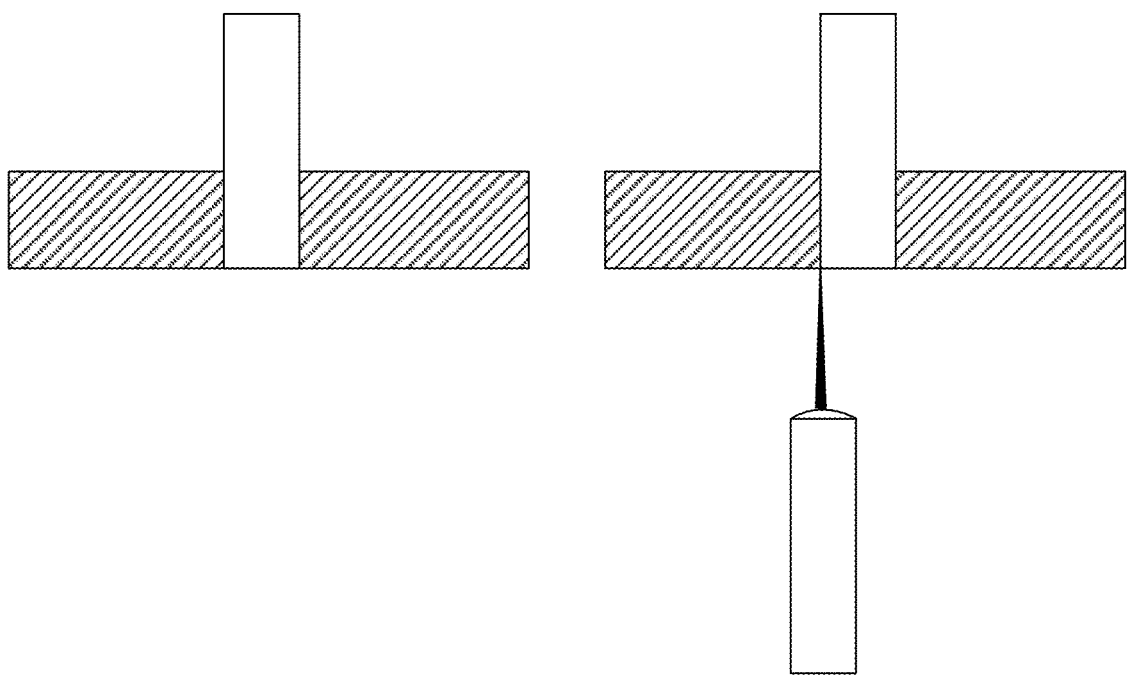

FIG. 5 shows an example of a method 500 that includes providing a spacer post and a plate component with a spacer post opening 510, inserting the spacer post into the spacer post opening 520, positioning the spacer post with respect to the plate component 530 and welding the spacer post to the plate component 540. As shown, welding can include laser welding where a laser beam is directed to a joint formed by the spacer post and the plate component to cause melting of materials of the spacer post and the plate component to form a weld. As to a welding process, it may include one or more of the features, for example, explained with respect to a plot 900 of FIG. 9. As an example, a welding process may proceed in a clockwise and/or in a counter-clockwise manner with respect to a longitudinal axis of a spacer post.

Figure 6:
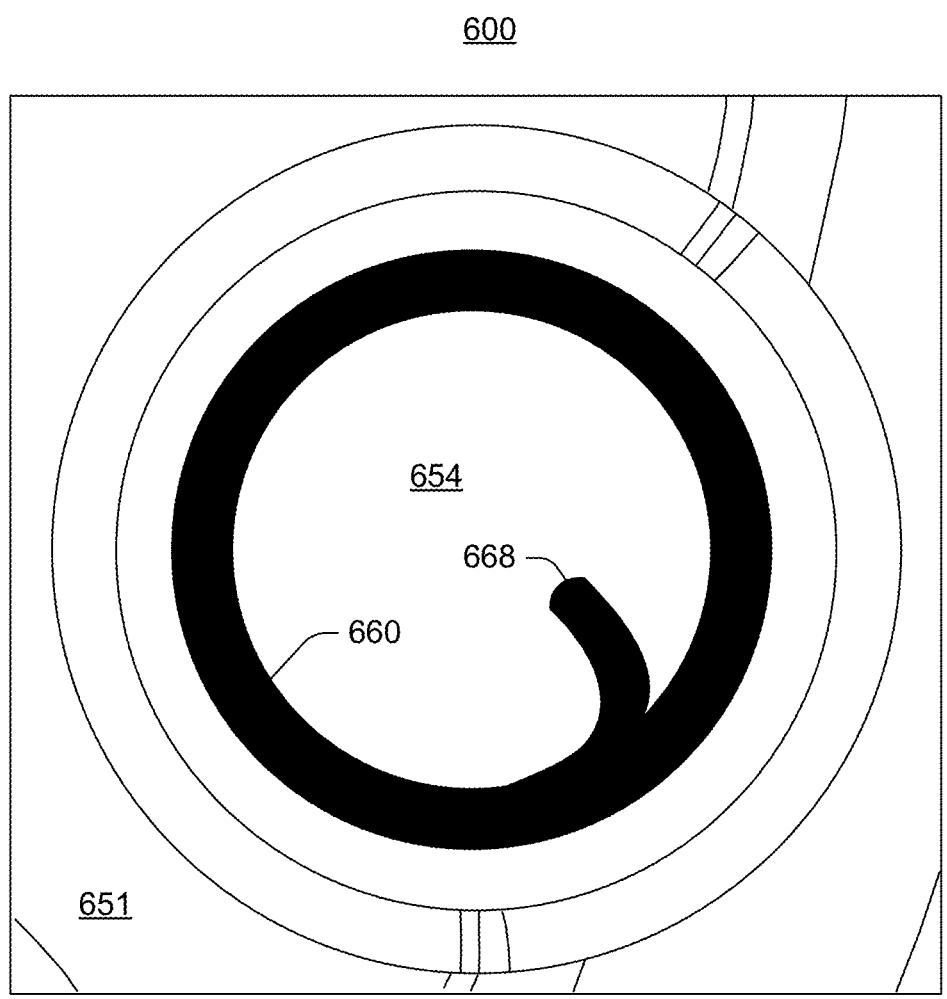
FIG. 6 is a plan view of an example of a portion of an assembly.

FIG. 6 shows an example of a portion of an assembly 600 with a spacer post 654 welded to a plate component 651 where a weld 660 is shown as a thick black curve that includes a tail 668 that extends into an end surface of the spacer post 654. As shown, the weld 660 is formed by a laser where the tail 668 is an end of the weld 660 in that it is formed last.

As an example, a cartridge for a turbine assembly can be formed at least in part by laser beam welding in a manner that reduces weld defects in less weldable materials. As explained, a cartridge can include vanes that can include fixed vanes and/or movable vanes to direct exhaust to a turbine wheel space.

Defects that can occur in a circular ramp-down area of a spacer post weld can progress over the time and cause failures such as, for example, one or more of the following: vane clearance reduction causing turbocharger performance drop; vane sticking causing worse controllability of turbocharger regulation; no vane controllability of turbocharger regulation; and turbocharger failure due to unattached spacer causing turbine wheel damage and/or vane damage.

As an example, a turbine assembly can include a VNT cartridge suitable for handling exhaust from a gasoline or diesel internal combustion engine. As an example, a laser beam welding approach may be implemented for welding of spacer posts that are made from what may be considered to be less weldable materials.

A conventional approach for fixing spacers in a cartridge that includes a plate component and a nozzle component involves riveting, which generally requires specific geometry of a spacer (e.g., shape), which can lead to higher costs when compared to an approach that can employ laser beam welding. For example, a conventional approach can involve use of specially shaped spacers where an end of such a spacer extends beyond a surface of a plate component or nozzle component such that it may be deformed to form a rivet connection. In a laser beam welding approach, a cartridge may do away with a nozzle component and rely on fixing spacer posts to a plate component via welding where ends of the fixed spacer posts can abut (e.g., contact) a surface of a turbine housing to thereby define a nozzle space (e.g., a vane space).

Laser beam welding, however, can impart defects that can lead to cracks and changes in vane clearance. Laser beam welding as applied to a nozzle component and specially shaped spacers can lead to cracks in the nozzle component and vane clearance shrinking. Without use of a nozzle component (e.g., use of a cartridge with a single vane space component such as the plate component 251) can alleviate negative consequences of the dual component approach and provide for improved durability and performance.

As mentioned, laser beam welding can impart defects, particularly in a ramp-down region where an overlap can exist between an initial portion of a weld and a subsequent, final portion of the weld. Referring to the example assembly 600 of FIG. 6, laser beam welding that employs a tail as a ramp-down portion (e.g., final portion of a weld) can reduce welding defects. As shown in FIG. 6, the ramp-down portion extends into virgin territory of the spacer post 654, which is previously a weld-free region. Such an approach can reduce risks associated with a weld over weld approach. Herein, laser beam welding may be referred to as LBW.

As an example, a LBW approach for spacer posts of a turbine assembly cartridge can lower costs (e.g., use of a simpler spacer), can increase accuracy compared to riveting (e.g., better vane axial clearance control, smaller variation, more stable performance of the cartridge, etc.), allow for smaller spacer diameter (e.g., less flow disruption, positive influence on performance, etc.), and reduce cartridge assembly cycle time.

As explained, LBW can be employed with a ramp-down area placed out of the weld. For example, a ramp-down area can be placed on a spacer post area that is interior to an exterior perimeter of the spacer post and thereby removed from an interface between the spacer post and a plate component. Alternatively, depending on the properties, shape, etc., of a plate component, a ramp-down area may be on the plate component rather than on a spacer post. In either approach, placing the ramp-down area outside the weld reduces reheating the weld metals, thus reducing the risk of defects creation in the weld area. Such an LBW approach can make weld critical zones more resistant against cracking and porosity creation, without undue influence on weld geometry and its required function. In various trials, applying a suitable fully automated LBW process using a suitable LBW machine, software and fixtures (including proper supply of the shielding gas), allowed for manufacture of a cartridge assembly with spacer posts and a plate component with adequate functional properties for high temperature applications.

As an example, a method can include employing LBW with a ramp-down area placed out of a weld where a laser beam shape is controlled by focusing optics, and where a laser beam area can be optionally changed by varying the working distance between the focusing device and the surface of the components, where the laser beam is perpendicular or lateral to the weldment surface (e.g., defined area of the spacer post and plate component), where quality of the laser beam is controlled, along with proper setup of operating parameters (e.g. laser power, feed rate, focus spot size, wobbling, shielding gas etc.), which may have an impact on final quality of the weld. In such an example, an automatic system can ensure relative movement of the weldment and the laser beam. For example, a spacer post and plate component can be clamped to a fixture that does not move where a laser beam moves relative to the stationary weldment. In such an example, melting surfaces of the spacer post and the plate component using the laser beam can form a melt pool, which can start in defined area (e.g., a ramp-up area) and replicate a spacer post interface where the welding trajectory does not end up directly in the weld, but is placed outside the weld (e.g., a ramp-down area), which may be placed on the spacer post end surface. In such an example, a method can include use of a shielding gas (e.g., helium, argon, nitrogen, etc.) delivered to a welding zone via a fixture to protect a melting pool from atmospheric conditions (e.g., oxygen, etc.). In various trials, a weld is formed that is more resistant against cracking and porosity creation where a ramp-down area is placed outside the weld such that it has reduced influence on a required weld geometry.

As explained, a cartridge assembly can be formed using LBW for spacer posts to plate component fixation in a manner with improved cost, improved vane axial clearance control, and less flow disruption (e.g., more optimal spacer shape, size, etc.).

As an example, a method can implement LBW with a ramp-down area out of a weld seam. Such an approach can be implemented for welding less weldable materials. As explained, such an approach can reduce welding defects as seen in a conventional ramp-down area of a weld seam, which tend to exhibit large longitudinal cracks. As an example, a LBW approach with a ramp-down area that forms a tail can help to reduce occurrence of various other defects compared to a conventional overlapping ramp-down area of a weld seam such as, for example, transversal cracks and porosity. As an example, a LBW approach may be implemented for welding of vane posts to vane control arms, which may be an alternative to a conventional riveting approach.

As an example, a method may employ tack welding, which may provide for reducing risk of a spacer post from potential moving during a LBW welding operation.

Figure 7:
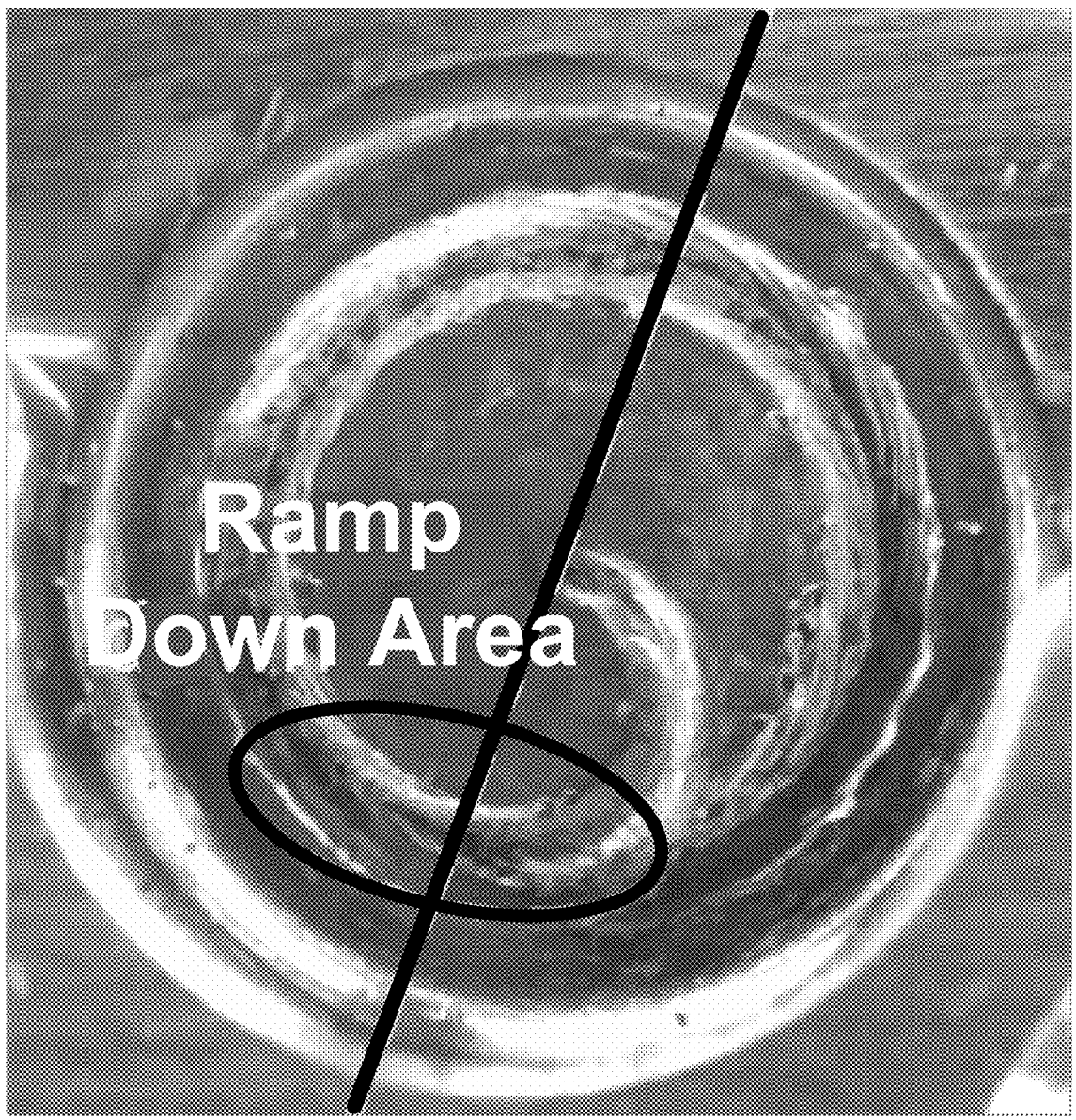
FIG. 7 is a photograph of a welded assembly.

FIG. 7 shows an example of a photograph 700 of a ramp-down area of a cartridge assembly where a LBW track deviates from an interface between a spacer post and an opening of a plate component to reduce risk of weld-over-weld defects. As an example, one or more of the features of the example shown in FIG. 6 may be used to describe one or more of the features of the example shown in FIG. 7.

Figure 8:
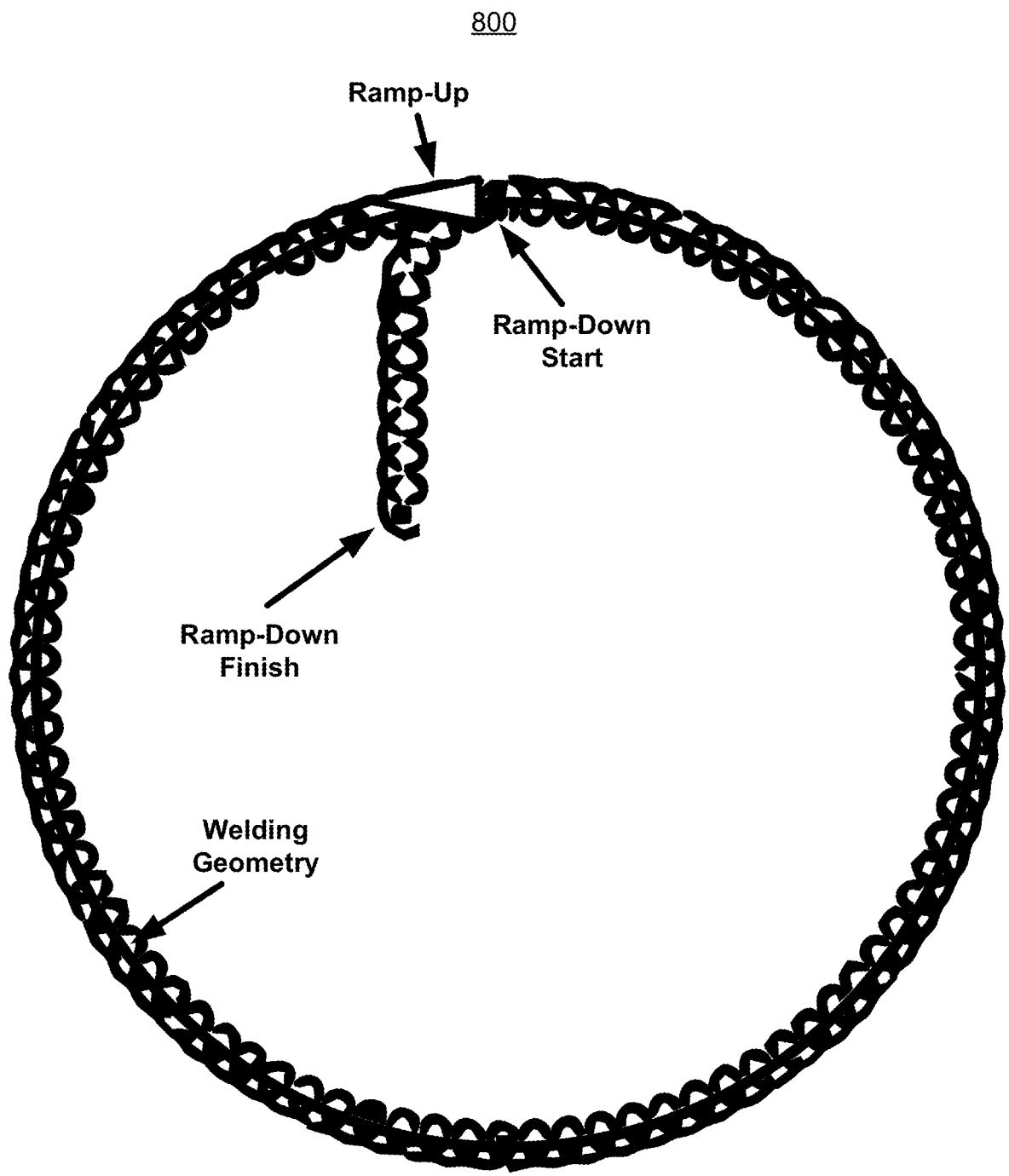
FIG. 8 is a graphic of an example of a weld with various areas.

FIG. 8 shows a graphic 800 of a weld formed using LBW where a welding geometry is indicated by a circle, where a ramp-up area is represented by a triangle (e.g., pointing generally in a forward direction) and where a ramp-down start area is indicated by an arrow that deviates from the welding geometry (circle) to tail off to a ramp-down finish, which is interior to the welding geometry (circle). As an example, a method can include wobbling of a laser beam spot of a LBW, which can involve making small looping movements. In such an example, a weld may include indicia of such small looping movements, which may, for example, improve weld quality.

As explained, a ramp-down area can be primarily in an area of a single component of two components that are welded together (at a weld joint). A ramp-down process can deviate from a joint formed by the two components (e.g., an interface) such that a weld goes from being a weld of two materials to a molten and subsequently hardened area of a single material. In various examples, a ramp-down process can progress from a larger radius (e.g., consider a post radius) to a smaller radius (e.g., less than a post radius). For example, in FIG. 7, the ramp-down laser melt marking on the post curves inwardly from the post radius where the ramp-down laser melt marking can be defined in part by a radius that is less than the post radius. After a turn inwardly, the ramp-down path may continue to curve or it may progress along a line (e.g., linearly as a line or straight). As explained, a ramp-down area may move outwardly away from an interface (e.g., joint) where a ramp-down melt marking may extend as a tangent to a post radius or, for example, may curve, as it moves away from the post.

Figure 9:
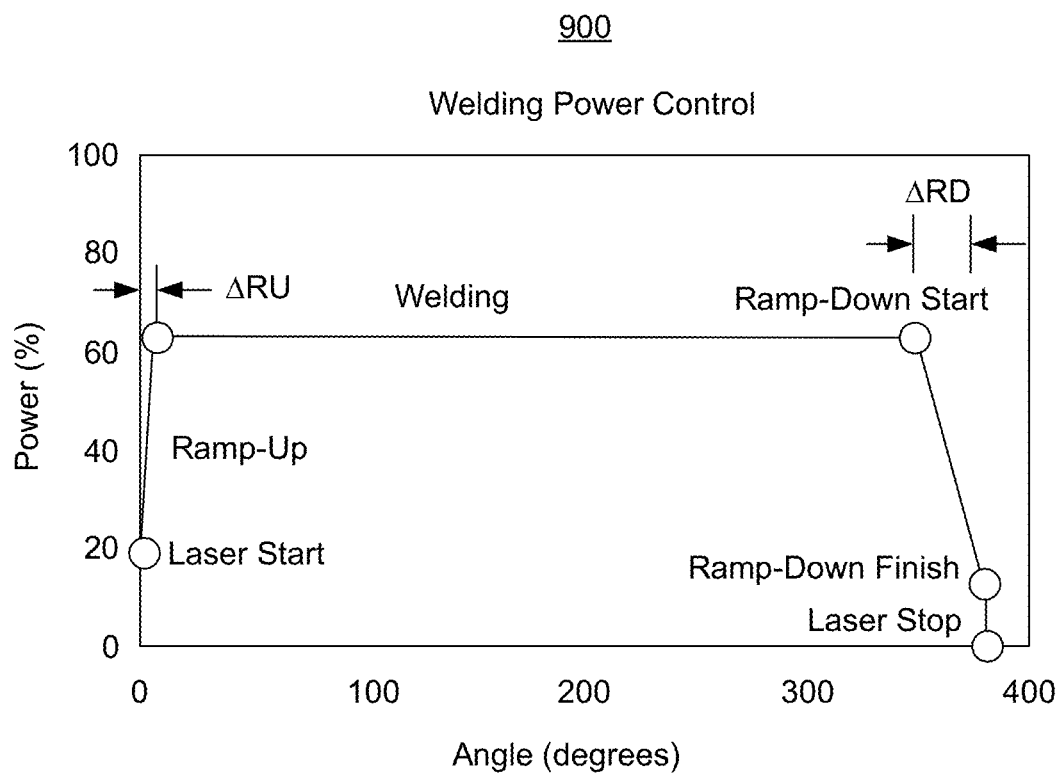
FIG. 9 is an example of a plot of power with respect to angle.

FIG. 9 shows an example plot 900 of welding power control for a LBW method where the plot 900 shows power in percent of total for a laser beam welder versus angle in degrees for an interface between a spacer post and an opening of a plate component. As shown, power ramps-up over a number of degrees from approximately 20 to approximately 60 percent (e.g., consider 2 degrees to 10 degrees), power then remains relatively constant at approximately 60 percent to approximately 360 degrees, at which time, a ramp-down process commences that ramps-down the power from approximately 60 percent to approximately 10 percent, where the laser beam welder power may be reduced to 0 percent (e.g., laser stop).

In the example of FIG. 9, the speed of the laser beam may be controlled to be relatively constant. As an example, power delivered to a component or components may be controlled by speed of movement of a laser beam (e.g., a beam spot of a laser beam).

In the example of FIG. 9, the plot 900 may include increasing power from 0 degrees to approximately 5 degrees, maintaining a substantially constant power from approximately 5 degrees to approximately 350 degrees and decreasing power from approximately 350 degrees to a tail that may at least in part overlap with a weld area formed while increasing the power (e.g., between 0 degrees and approximately 5 degrees). As explained, a tail may tail inwardly or may tail outwardly to reduce one or more types of weld defects that may be formed by weld-over-weld welding. In the example of FIG. 9, a ramp-up distance ΔRU and a ramp-down distance ΔRD are shown, which may be defined using degrees and/or millimeters.

Figure 10:
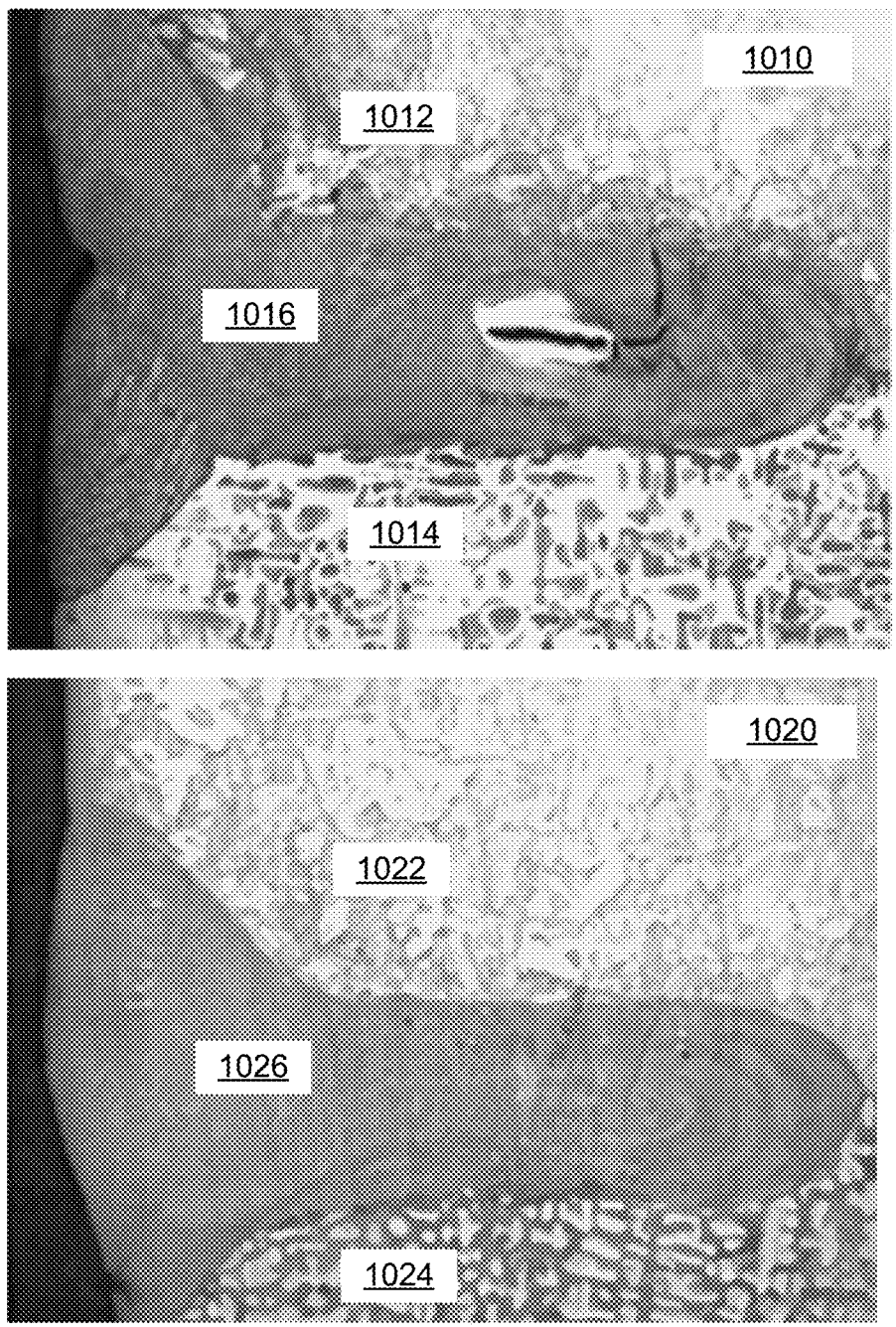
FIG. 10 is a series of photographs of examples of welds.

FIG. 10 shows micrographs 1010 and 1020 of cross-sections of a spacer post 1012 and a plate component 1014 and a spacer post 1022 and a plate component 1024. In the micrograph 1010, weld-over-weld was utilized; whereas, in the micrograph 1020, a deviated ramp-down area was utilized. As can be seen in the micrographs 1010 and 1020, defects are reduced for the deviated ramp-down area approach.

As an example, a laser beam welder can operate with a power that may be adjustable (e.g., 20 W to 2000 W), for example, with a wavelength of approximately 1030 nm, with a beam quality of approximately 2 mm-mrad (e.g., beam parameter product (BPP)). The BPP of a laser beam is defined as the product of beam radius (measured at the beam waist) and the beam divergence half-angle (measured in the far field). Units can be mm-mrad (millimeters times milliradians). The BPP may be used to specify the beam quality of a laser beam, where the higher the BPP, the lower is the beam quality.

As an example, a LBW method can include a limited amount of overlap between a ramp-up area and a ramp-down area. For example, consider an overlap of approximately 0.1 degrees to approximately 4 degrees. In general, an overlap can be less than 10 degrees. In the example of FIG. 8, the graphic 800 shows an overlap that can be a partial overlap, for example, the ramp-down start can be at approximately 360 degrees where a turn can partially overlap a ramp-up area, for example, being offset partially toward the interior, noting that an outward turn may be implemented rather than an inward turn.

As an example, a method can include aiming a laser beam of a laser beam weld at an interface between two components or at an offset slightly from such an interface. For example, consider a laser beam having a laser beam size that is aimed at an interface, slightly offset to one component or slightly offset to another component. As an example, an offset may provide for a 60:40 or 40:60 mix of materials between two components.

As an example, a turbine housing assembly can include a turbine housing that defines a rotational axis for a turbine wheel; and a cartridge receivable by the turbine housing, where the cartridge includes spacer posts and a plate component that includes spacer post openings, where the spacer posts are laser beam welded into the spacer post openings to form laser beam welds to define an axial vane clearance between the plate component and a surface of the turbine housing contacted by ends of the spacer posts, and where each of the laser beam welds includes a power ramp-up area, an intermediate area and a power ramp-down area, where the power ramp-down area curves away from the power ramp-up area to reduce weld defects. In such an example, the power-ramp up area can start at 0 degrees where the intermediate area has an arc of more than 330 degrees and less than 360 degrees. In such an example, the power ramp-up area can have an arc of more than 2 degrees and less than 25 degrees. In such an example, the power ramp-down area can start at an end of the intermediate area.

As an example, a power-ramp up area can start at 0 degrees where the power ramp-down area starts at more than 330 degrees and less than 365 degrees.

As an example, a power ramp-down area can include a hardened weld melt portion formed solely by a material of a spacer post. For example, the power ramp-down area may curve inwardly (e.g., to a lesser radius than an outer radius of a spacer post).

As an example, a power ramp-down area can include a hardened weld melt portion formed solely by a material of a plate component. For example, the power ramp-down area may curve outwardly (e.g., to a greater radius than an outer radius of a spacer post).

As an example, a power ramp-up area can include a hardened weld melt portion formed by a material of a plate component and a material of a spacer post. In such an example, the materials may differ.

As an example, at least an intermediate area of a weld of a spacer post and a plate component can include indicia of looping movements during welding. Such looping movements may be referred to as wobbles or oscillations, which may be controlled during welding to improve one or more characteristics of a weld. For example, consider controlling aim of a beam spot during welding to cause the beam spot to move in a looping manner (e.g., with wobbles or oscillations). As an example, a looping approach can be defined in part by an inner radius and an outer radius where, for example, a post radius is between the inner radius and the outer radius. In such an example, the inner radius and the outer radius may be relatively close to the post radius (e.g., minus and plus 10 percent or less) such that melt formed by a laser beam during looping includes materials from both a spacer post and a plate component. As an example, a ramp-up and/or a ramp-down may include looping.

As an example, a turbine housing assembly can include vanes disposed between a plate component and a turbine housing. As explained, spacer posts can be welded into a plate component and contact a surface of a turbine housing where vanes can be disposed, at least in part, between the plate component and the surface of the turbine housing.

As an example, a method can include providing a plate component of a turbine housing vane cartridge, where the plate component includes spacer post openings; positioning spacer posts in the spacer post openings; and laser beam welding the spacer posts to the plate component using a laser beam to form laser beam welds, where each of the laser beam welds includes a power ramp-up area, an intermediate area and a power ramp-down area, where the power ramp-down area curves away from the power ramp-up area to reduce weld defects.

In such an example, for each of the laser beam welds, the laser beam welding can include ramping up power of the laser beam over an arc greater than 2 degrees and less than 25 degrees to form the power ramp-up area.

As an example, for each laser beam weld, laser beam welding can include ramping down power of a laser beam after forming an intermediate area over an arc of greater than 330 degrees and less than 360 degrees.

As an example, for each laser beam weld, laser beam welding can include moving a beam spot of a laser beam away from a power ramp-up area to form at least a portion of a power ramp-down area. In such an example, the laser beam welding can include ramping down the power of the laser beam while moving the beam spot of the laser beam. As an example, moving a beam spot can include moving the beam spot away from a welded spacer post and plate component interface. For example, consider moving the beam spot away by moving the beam spot solely onto a spacer post surface or, for example, consider moving the beam spot away by moving the beam spot solely onto a plate component surface.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A method comprising:
   providing a plate component of a turbine housing vane cartridge, wherein the plate component comprises spacer post openings;
   positioning spacer posts in the spacer post openings;
   laser beam welding the spacer posts to the plate component using a laser beam to form laser beam welds, wherein each of the laser beam welds comprises a power ramp-up area, an intermediate area and a power ramp-down area, wherein the ramp-down area curves away from the ramp-up area to reduce weld defects; and
   wherein, for each of the laser beam welds, the laser beam welding comprises ramping up power of the laser beam over an arc greater than 2 degrees and less than 25 degrees to form the power ramp-up area.

2. The method of claim 1, wherein, for each of the laser beam welds, the laser beam welding comprises ramping down power of the laser beam after forming the intermediate area over an arc of greater than 330 degrees and less than 360 degrees.

3. The method of claim 1, wherein, for each of the laser beam welds, the laser beam welding comprises moving a beam spot of the laser beam away from the power ramp-up area to form at least a portion of the power ramp-down area.

4. The method of claim 3, wherein the laser beam welding comprises ramping down the power of the laser beam while moving the beam spot of the laser beam.

5. The method of claim 3, wherein the moving the beam spot comprises moving the beam spot away from a welded spacer post and plate component interface.

6. The method of claim 5, wherein the moving the beam spot away comprises moving the beam spot solely onto a spacer post surface.

7. The method of claim 5, wherein the moving the beam spot away comprises moving the beam spot solely onto a plate component surface.

8. The method of claim 1, comprising forming the turbine housing vane cartridge using the plate component and the spacer posts welded thereto.

9. A turbine housing assembly comprising the turbine housing vane cartridge formed according to the method of claim 8.

* * * * *